United States Patent
Piercey

(10) Patent No.: US 11,444,494 B2
(45) Date of Patent: Sep. 13, 2022

(54) SYSTEMS, DEVICES AND METHODS FOR ELECTRICAL AND/OR ELECTRONIC INTERCONNECTION

(71) Applicant: Fossil Group, Inc., Richardson, TX (US)

(72) Inventor: Brad Piercey, Oak Point, TX (US)

(73) Assignee: Fossil Group, Inc., Richardson, TX (US)

(*) Notice: Subject to any disclaimer, the term of this patent is extended or adjusted under 35 U.S.C. 154(b) by 81 days.

(21) Appl. No.: 16/704,563

(22) Filed: Dec. 5, 2019

(65) Prior Publication Data

US 2020/0112207 A1 Apr. 9, 2020

Related U.S. Application Data

(63) Continuation of application No. PCT/US2018/036486, filed on Jun. 7, 2018.

(60) Provisional application No. 62/516,763, filed on Jun. 8, 2017.

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC ............ H02J 50/80; H02J 50/10; H02J 50/12
See application file for complete search history.

(56) References Cited

U.S. PATENT DOCUMENTS

| | | | |
|---|---|---|---|
| 2008/0079388 A1 | 4/2008 | Sarnowsky et al. | |
| 2011/0101788 A1 | 5/2011 | Sun et al. | |
| 2011/0298419 A1* | 12/2011 | Tsai | H02J 50/80 |
| | | | 320/108 |
| 2012/0193993 A1 | 8/2012 | Azancot et al. | |
| 2013/0285601 A1 | 10/2013 | Sookprasong et al. | |

(Continued)

FOREIGN PATENT DOCUMENTS

| | | |
|---|---|---|
| CN | 205864024 U | 1/2017 |
| EP | 0788212 A2 | 8/1997 |

(Continued)

OTHER PUBLICATIONS

International Search Report and Written Opinion for International Application No. PCT/US2018/036486, dated Sep. 14, 2018, 11 pages.

(Continued)

*Primary Examiner* — Nghia M Doan
(74) *Attorney, Agent, or Firm* — Cooley LLP

(57) ABSTRACT

A wireless charging system includes an electrical and/or electronic interconnect as first connector. The transmitter electronics are included in the first connector. The first connector is electrically connected to a second connector via a cable. The second connector includes a transmitter coil. The first connector, cable, and the second connector are form the transmitter portion of the wireless charging system. Information from a receiver is obtained by the first connector which demodulates and processes the information and based on the request from the receiver changes the impedance and switching frequency of a tank circuit of the transmitter coil. Efficiency of the wireless charging system is optimized while reducing the form factor.

21 Claims, 8 Drawing Sheets

(56) References Cited

U.S. PATENT DOCUMENTS

| | | |
|---|---|---|
| 2014/0354223 A1 | 12/2014 | Lee et al. |
| 2015/0188357 A1 | 7/2015 | Chen et al. |
| 2016/0308397 A1 | 10/2016 | Jung et al. |
| 2017/0063142 A1* | 3/2017 | Loewen .................. H02J 7/025 |
| 2017/0117738 A1* | 4/2017 | Yeoh ....................... H02J 5/005 |
| 2017/0187248 A1 | 7/2017 | Leabman |
| 2017/0237280 A1* | 8/2017 | Baarman ............... H02J 7/0044 |
| | | 320/108 |

FOREIGN PATENT DOCUMENTS

| | | | |
|---|---|---|---|
| WO | WO-2008108963 A1 * | 9/2008 | ............. H02J 50/10 |
| WO | WO 2010/022181 A1 | 2/2010 | |
| WO | WO 2010/080739 A2 | 7/2010 | |
| WO | WO 2018/226977 A1 | 12/2018 | |

OTHER PUBLICATIONS

Office Action issued in EP Application No. 18814066.9, dated Mar. 25, 2022, 6 pages.
Supplemental European Search Report issued in EP 18814066.9, dated Oct. 23, 2020, 10 pages.

* cited by examiner

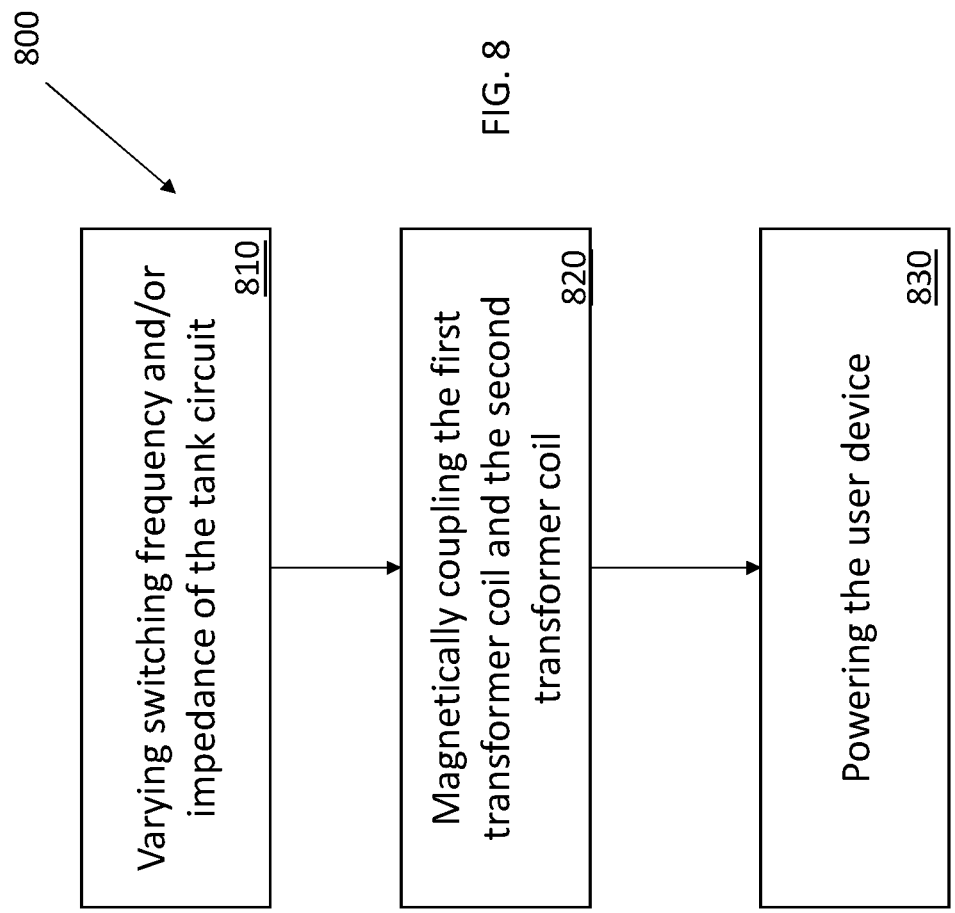

SYSTEMS, DEVICES AND METHODS FOR ELECTRICAL AND/OR ELECTRONIC INTERCONNECTION

CROSS-REFERENCE TO RELATED APPLICATIONS

This application is a continuation of International Patent Application No. PCT/US2018/036486, entitled "Systems, Devices and Methods for Electrical and/or Electronic Interconnection," filed on Jun. 7, 2018, which claims priority to, and the benefit of, U.S. Provisional Application No. 62/516,763, entitled "Systems, Device and Methods for Electrical and/or Electronic Interconnection," filed on Jun. 8, 2017, the disclosures of which are incorporated herein by reference in their entirety.

BACKGROUND

Embodiments described herein relate generally to systems, devices, and methods of electrical and/or electronic interconnection for wireless charging of wearable devices.

Form factor plays a major role in wearable technology—not just for the wearable device itself, but for associated components, such as charging systems associated with the wearable device.

In particular, wireless-inductive charging systems are increasingly employed for charging wearables since they eliminate the need for multiple chords, making them hassle-free and easy to use. Wireless-inductive chargers are generally constructed from a transformer that is split into two parts, a primary coil and a secondary coil. In general, the primary coil is housed in a unit (e.g., a transmitter unit) connected to the power supply and the secondary coil is housed in a unit (e.g., a receiver unit) that includes a chargeable battery, such as the wearable itself. The transmitter unit also houses transmitter electronics such as oscillator circuits and/or modulator circuits. As a result, these transmitter units tend to be bulky, increasing the form factor of the overall wireless charging system.

There is hence an unmet need to reduce the form factor of transmitter units while optimizing the efficiency of wireless charging systems.

SUMMARY

Device and methods for electrical and/or electronic interconnection are disclosed herein. In some embodiments, a device includes a first connector. The first connector includes a first circuit. The device can also include a second connector that is communicably coupled to the first connector. The second connector includes a tank circuit and a first transformer coil that is coupled to the tank circuit. The first circuit is configured to vary at least one of switching frequency and impedance of the tank circuit. The tank circuit is configured to magnetically couple the first transformer coil and a second transformer coil of a user device based on the at least one of the switching frequency and the impedance, such that the first transformer coil powers the user device based on the magnetic coupling.

In some embodiments, a method includes varying at least one of switching frequency and impedance of a tank circuit via a first circuit. The first circuit is included in a first connector that is communicably connected to a second connector. The second connector includes the tank circuit and a first transformer coil. The first transformer coil is coupled to the tank circuit. The method also includes magnetically coupling the first transformer coil and a second transformer coil of a user device at the tank circuit based on the at least one of the switching frequency and impedance. The method also includes powering the user device based on the magnetic coupling between the first transformer coil and the second transformer coil.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8 is a flowchart illustrating a method for wirelessly charging a device, according to some embodiments.

DETAILED DESCRIPTION

The present disclosure describes systems, devices and methods for reducing form factor of wireless power charging systems while maintaining/optimizing efficiency.

In some embodiments, a wireless charging system can be used to charge electrical and/or electronic devices (e.g., wearable devices) via inductive charging. In some embodiments, a wireless charging system can include a transformer formed between a first coil associated with a first device (also sometimes referred to as a "charging device") and a second coil associated with a second device (also sometimes referred to as a "user device"). The first coil is housed in the first device (e.g., transmitter unit), which in turn is connected to a power supply. The second coil is housed in the second device (e.g., receiver unit), which in turn is in coupled and/or connected to a battery or an electrical/electronic device. In some embodiments, the second device can be a part of the electrical/electronic device, the electrical/electronic device itself, an external coil connected to the electrical/electronic device, and/or a combination thereof. In some embodiments, in a typical use scenario, alternating current (AC) is sent to the first device via the power supply and is transmitted to the first coil via one or more electronic circuits (e.g., oscillator circuits, modulator circuits) (hereon "transmitter electronics") housed in the first device. When the second device is placed within a suitable distance of the first device, the alternating current flowing within the first coil creates a magnetic field that extends to the second coil housed in the second device. This magnetic field generates alternating current within the second coil of the second device and can be converted to direct current by the second device to charge a battery and/or an electrical/electronic device.

In conventional approaches, the first device housing the first coil tends to be bulky since it houses transmitter electronics as well, and this increases the form factor of the first device, as well as the overall wireless charging system. In contrast, embodiments described herein use an electrical and/or electronic interconnect (e.g., a Universal Serial Bus (USB) plug) to house transmitter electronics remote from, but coupled to, the first device. The electrical and/or electronic interconnect (hereon "interconnect") along with the first coil can then together form the first device.

Figure 1:
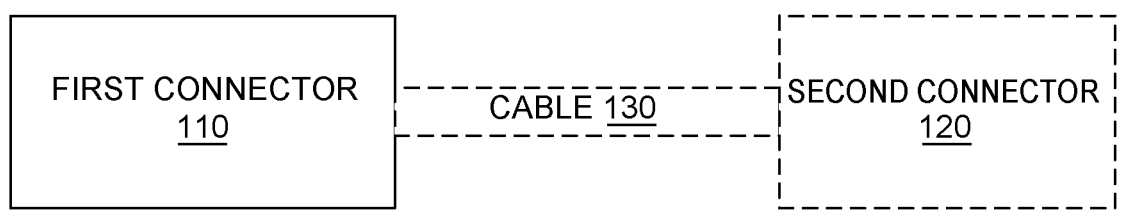
FIG. 1 is a schematic illustration of a first device that facilitates wireless power charging of a second device, according to some embodiments.

FIG. 1 is a schematic illustration of a device 100 (also sometimes referred to as a "first device") that facilitates wireless power charging of a second device 101, according to some embodiments. In some embodiments, the first coil is housed in the device 100 and the device 100 acts as the transmitter unit of the wireless power charging system. The device 100 includes a first connector 110 connected by a cable 130 to a second connector 120.

In some embodiments, the first connector 110 can be any suitable interconnect, such as a plug interface, that can be configured to power an electrical/electronic device and/or transfer information between electrical/electronic devices. Some non-limiting examples of interconnects include, but are not limited to, USB plugs, keyed connectors, pin connectors, optical fiber connectors, hybrid connectors, wireless charging modules, and/or the like. In some embodiments, the first connector 110 includes a male connector (e.g., includes an exposed, unshielded electrical terminal), while in other embodiments, the first connector 110 includes a female connector (e.g., includes an electrical terminal in a receptacle). In some embodiments, the first connector 110 is a standard USB 2.0 connector, such as a USB 2.0 plug. In some embodiments, the first connector 110 includes a housing with a length up to about 25 mm, including all values and sub-ranges in between. In some embodiments, the first connector has a length of about 25 mm, a width of about 15.6 mm and a height of about 8.1 mm, including all values and sub-ranges in between.

Figure 4:
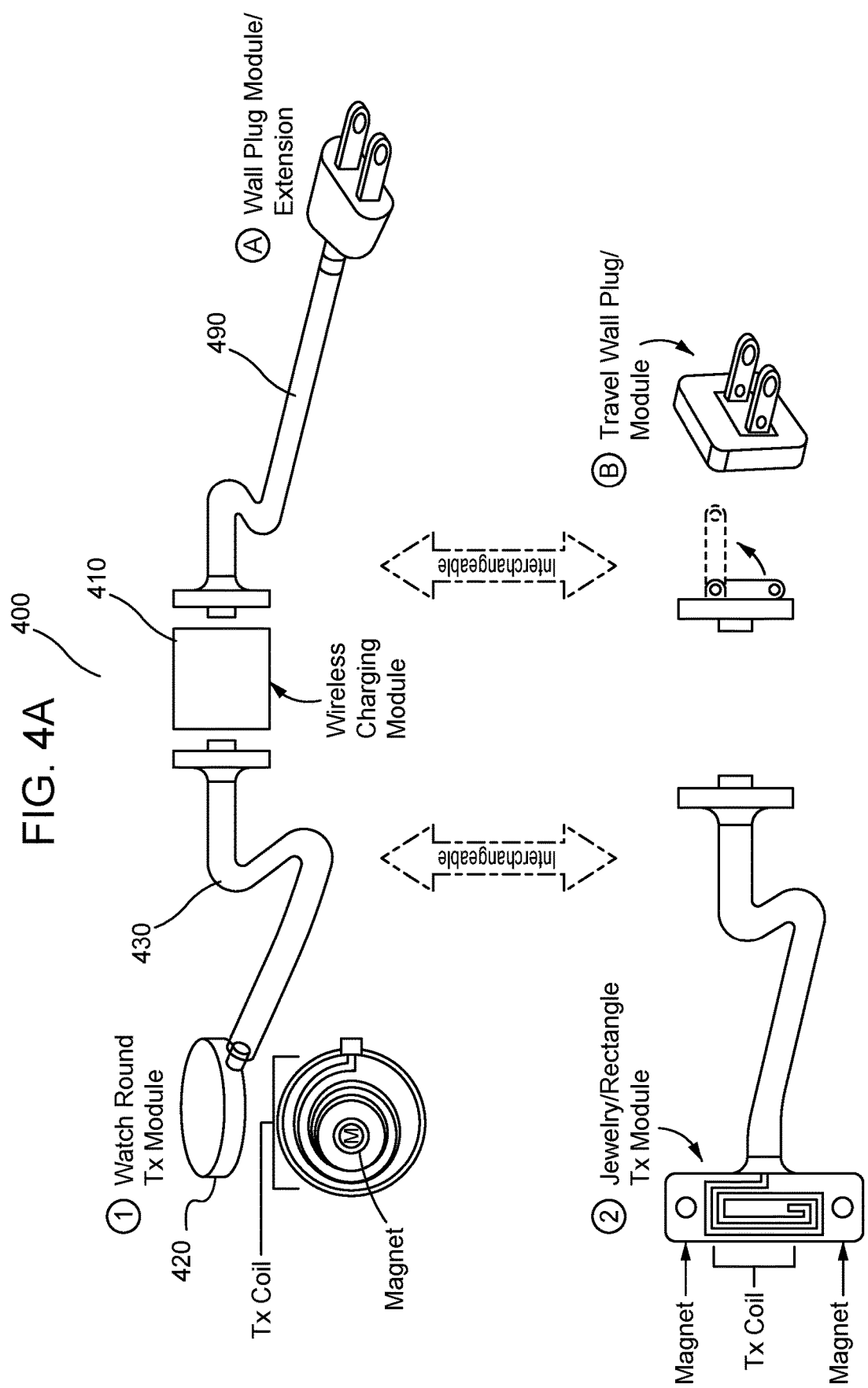
FIG. 4A is an illustration of a device that facilitates wireless power charging, according to other embodiments.
FIG. 4B is an example of a second connector of the device shown in FIG. 4A, according to some embodiments.
FIG. 4C is an example of an extension component of the device shown in FIG. 4A, according to some embodiments.

In some embodiments, the first connector 110 is associated with a housing that includes transmitter electronics, such as one or more circuits configured for facilitating electronic transmission of information received by the first connector 110. In some embodiments, the transmitter electronics and/or components are mounted on a Printer Circuit Board (PCB) via Surface Mount Technology (SMT). The PCB can be disposed, coupled, attached, and/or integrally formed with the first connector 110. In some embodiments, the transmitter electronics can include a wireless controller integrated circuit (also referred to as "controller circuit"), a field-effect transistor (e.g., half-bridge MOSFET), and an electronic filter as best illustrated in FIG. 4, and described in detail later. In some embodiments, the transmitter electronics are mounted on a PCB, and the PCB is disposed in the first connector 110. In some embodiments, the controller circuit is mounted on a PCB, and the PCB, the half-bridge MOSFET, and electronic filter are disposed in the first connector 110.

The controller circuit in the first connector 110 can be configured for transmitter control. For example, information (e.g., packets of data with a request to increase and/or decrease power of transmission between the first coil and the second coil) from a second device 101 housing a second coil of a wireless charging system is obtained by the controller circuit via the second connector 120. In some embodiments, the controller circuit is configured for digital demodulation of this information. For instance, if the device 100 receives packets of data denoting a request to increase power, the controller circuit included in the first connector 110 is configured to demodulate the request and, in response to this request, lower the switching frequency of the device 100 by decreasing the impedance of the resonant circuit/LC circuit/tank circuit in the first coil (e.g., a transmitter coil included in the second connector 120, described in more detail later). This permits more current to be generated by the device 100. If the device 100 receives a request for decrease in power, then the controller circuit included in the first connector 110 can be configured to demodulate the request and, in response to this request, increases the switching frequency of the device 100. In some embodiments, the controller circuit is a STWBC digital controller that is Qi compatible and meets the open interface standard developed by the Wireless Power Consortium for inductive charging over distances of up to 4 cm. In some embodiments, the controller circuit can precisely control the amount of transmitted power based on the requirements and requests that the device 100 receives thus maximizing the efficiency of the wireless charging system. In some embodiments, the controller circuit can support up to 5 W applications and provides native support to half-bridge and full-bridge topologies. The controller circuit can also include memory such as flash, E2PROM that provides data retention to up to about 15 years.

In some embodiments, the input to the first connector 110 is in the range of 4.75V-5.25V and commonly about 5V. In some embodiments, the first connector 110 can include a lightpipe (not shown) that lights up while charging a wearable device with at least two different colors representing charging state and fully-charged state. For example, when the first connector 110 is a USB plug, it can include a light pipe that is red when the second device 101 (e.g., a wearable, such as a smart watch) coupled to the device 110 is being charged, and is green when the second device 101 is fully charged.

Still referring to FIG. 1, the second connector 120 is in electrical and/or electronic communication with the first connector 110 via the cable 130. In some embodiments, the second connector 120 houses the first coil (e.g., transmitter coil) of the wireless charging system. The second connector 120 can encompass a coil head assembly including the first coil, a ferrite shield and an alignment magnet. Magnetic coupling between the first coil and a second coil (e.g., a receiver coil of the second device) included in second device 101 generates electric power to power a wearable device. The second device 101 can be in contact with the second connector 120 and/or placed at a distance from the second connector 120 to power the wearable device. In some embodiments, based on communications with the second device 101, the first connector 110 changes the switching frequency and the impedance of the tank circuit in the first coil.

In some embodiments, the second connector 120 has a diameter of about 26 mm and a thickness of about 4.5 mm. In some embodiments, the transmitter coil can be a specialized multistrand wire or cable. For example, the transmitter coil can include 20 strands of 0.1 mm diameter Litz wire. In some embodiments, the transmitter coil can be a single strand wire or cable. In some embodiments, the alignment magnet is a rare earth magnet such as a neodymium magnet (e.g., a grade N35 neodymium magnet) and the ferrite shielding is about 1.0 mm thick. In some embodiments, the alignment magnet can be a metallic element with magnetic properties. In some embodiments, the alignment magnet can be constructed from a composite material, such as ferrite.

The first connector 110 is in electrical communication with the second connector 120 via a cable 130. In some embodiments, the cable 130 is a round cable with a length of about 1 meter. In some embodiments, the cable 130 can be a flat cable.

During use with a second device 101, the device 100 can function as a transmitter. The first connector 110 houses the transmitter electronics and functions as a controller to control the power of transmission between the first coil and the second coil and/or to monitor and control the exchange of information between the device 100 and the second device 101. Information from the second device 101 that acts as a receiver is received by the first connector 110, which is then demodulated by the first connector 110. The first connector 110 and the second connector 120 are in electrical communication via the cable 130. In response to the requests to vary output power received by the first connector 110, the first connector 110 varies the switching frequency and the impedance of the tank circuit included in the second connector 120. The change in switching frequency and impedance varies the output power generated due to magnetic coupling between the first coil included in the second connector 120 of the device 100 and a second coil included in the second device and placed at a location external to the device 100. Thus, the functionality of the wireless changing approach is retained while reducing form factor.

In some embodiments, the device 100 disclosed herein acts as a transmitter of a wireless charging system to charge a wearable device, such as a fitness tracker. The second device 101 that acts as a receiver can be a part of the wearable device, the wearable device itself, an external coil connected to the wearable device and/or a combination thereof. A fitness device/tracker may include one or more power sources such as a rechargeable battery that is charged using the wireless charging system described herein. The rechargeable battery is used to power components such processors, electronic circuits such as printed circuit boards (PCBs), and/or the like; one or more input sensors or interfaces for receiving input from a user; fitness sensors for monitoring, tracking, and/or otherwise determining fitness parameters/data associated with a user; one or more storage media for storing the user input and/or the fitness data; one or more communication modules for wirelessly communicating and/or otherwise transferring the user input and/or the fitness data, or information associated therewith, such as to another device, and/or the like.

In some embodiments, the first connector 110 and the second connector 120 described herein are Qi compatible. The device 100 of the wireless charging system controls and provides the required amount of wireless power to the second device 101 depending on the request that it receives from the second device 101. Utilizing an interconnect (e.g., first connector 110) to embed transmitter electronics reduces the form factor of the device 100 and hence the form factor of the wireless charging system while maintaining and/or optimizing efficiency.

Figure 2:
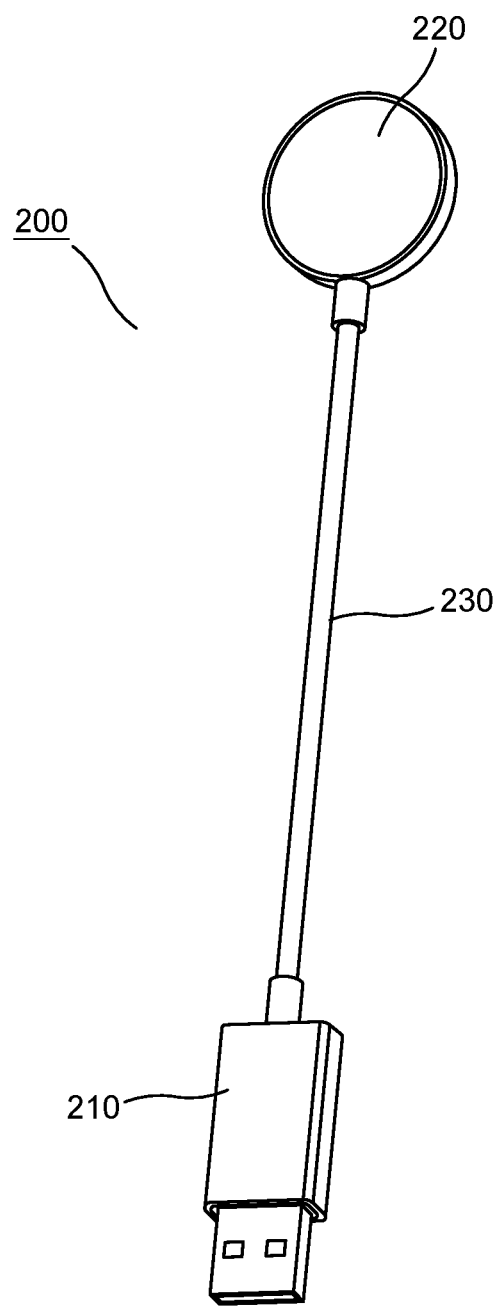
FIG. 2 is an illustration of a device that facilitates wireless power charging, according to some embodiments.

FIG. 2 is an illustration of a device 200 (also sometimes referred to as a "first device 200") of a wireless charging system that can be functionally similar to the device 100 as shown in FIG. 1, according to some embodiments. The device 200 includes a first connector 210 that is connected to a second connector 220 via a cable 230. The first connector 210 is a standard USB 2.0 plug connector and houses transmitter electronics. In some embodiments, the transmitter electronic circuits and/or components are mounted on a PCB via SMT. The PCB can be disposed, coupled, attached, and/or integrally formed with the first connector 210. The second connector 220 can encompass a coil head assembly including the first coil, ferrite shield and an alignment magnet. The second connector 220 includes a housing with a matte finish. A second device (e.g., receiver) of the wireless charging system can be in contact with the second connector 220 and/or placed at a distance from the second connector 220 to power the wearable device. Transmitter electronics are included in the first connector 210 reducing the form factor of the device 200. Components of 200 can be structurally/functionally similar to similarly named and referenced components of FIG. 1.

Figure 3:
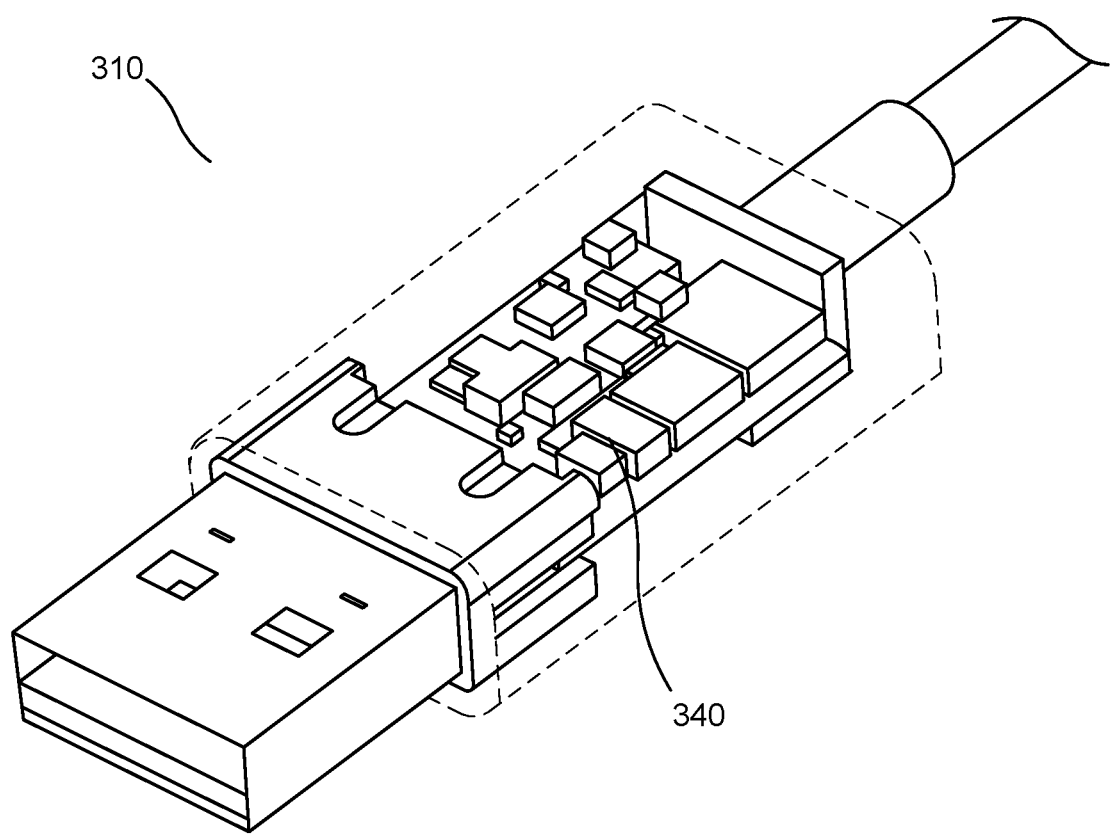
FIG. 3 illustrates a first connector of the device shown in FIG. 1 of a wireless charging system, according to some embodiments.

FIG. 3 illustrates a first connector 310 that can be structurally and/or functionally similar to the first connector 210 and/or the first connector 110, according to some embodiments. In some embodiments, the first connector 310 is a standard USB 2.0 plug. The transmitter electronics (e.g., controller circuit, half-bridge MOSFET, and electronic filter) are disposed in the first connector 310. In some embodiments, the components of transmitter electronics, that is, the controller circuit, half-bridge MOSFET, and electronic filter are mounted on a PCB 340 via Surface Mount Technology (SMT). The PCB 340 can be disposed, coupled, attached, and/or integrally formed with the first connector 310. In some embodiments, the controller circuit is mounted on a PCB 340, and the PCB 340, the half-bridge MOSFET, and electronic filter are disposed in the first connector 310.

In some embodiments, the controller circuit can be configured for transmitter control. In some embodiments, the controller circuit can precisely control the amount of power transmitted between the first coil and the second coil. In some embodiments, the controller circuit is Qi compatible and can meet the open interface standard developed by the Wireless Power Consortium. In some embodiments, the controller circuit can provide native support to half-bridge and full-bridge topologies. In some embodiments, the half-bridge MOSFET can include four switching elements that can be turned on and off independently. In some embodiments, the half-bridge MOSFET uses electric field to control the electrical behavior of the controller circuit. In some embodiments, the half-bridge MOSFET can be a type of field-effect transistor. In some embodiments, the electronic filter can perform signal processing functions. Some non-limiting examples of an electronic filter include passive filter, active filter, analog filter, digital filter, high-pass filter, low-pass filter, band-pass filter, band-stop filter, all-pass filter, discrete-time filter, continuous-time filter, linear filter, non-linear filter, infinite impulse response filter, finite impulse response filter, and/or the like. Components of the first connector 310 can have similar functionality to similarly named components of FIG. 1.

FIG. 4A is an illustration of a device 400 (also sometimes referred to as a "first device 400") of a wireless charging system that can be functionally similar to the device 100 as shown in FIG. 1, according to some embodiments. The device 400 includes a first connector 410 that can be removably connected and/or coupled to a second connector 420 via a cable 430. In some embodiments, the first connector 410 can include a wireless charging module and houses transmitter electronics. In some embodiments, the wireless charging module can include a plastic box that houses transmitter electronics. In some embodiments, the wireless charging module is a universal plug with one or more female connectors (e.g., includes an electrical terminal in a receptacle) on one or more interfaces of the universal plug. In some embodiments, the wireless charging module is a universal plug with one or more male connectors (e.g., adapter pins, two- or three-prong plug, and/or the like) on one or more interfaces of the universal plug. In some embodiments, the female connectors can include pin sockets, as best illustrated and described in more detail for FIG. 5. In some embodiments, the second connector 420 can be connected to the wireless charging module via the female connectors on the wireless charging module using the cable 430. The cable can include a male connector such as adapter pins. The second connector 420 can be connected to the first connector 410 via a female connector on a first side/interface 415a. An extension device 490 such as a wall plug module, an extension adapter, a combination thereof, and/or the like can be connected to the first connector 410 via a female connector on a second side/interface 415b. In some embodiments, the transmitter electronic circuits and/or components are mounted on a PCB via SMT. The PCB can be disposed, coupled, attached, and/or integrally formed with the first connector 410.

The second connector 420 can encompass a coil head assembly including the first coil, ferrite shield and an alignment magnet. The second connector 420 includes a housing with a matte finish. A second device (e.g., receiver) of the wireless charging system can be in contact with the second connector 420 and/or placed at a distance from the second connector 420 to power the wearable device. Components of 400 can be structurally/functionally similar to similarly named and referenced components of FIG. 1. Referring to FIG. 4A, the second connector 420 can be configured to power a device that has a round shape such as a watch. FIG. 4B is an illustration of an example second connector 420, in accordance with some embodiments. The second connector 420 in FIG. 4B can be configured to power a device that may also serve as jewelry and/or be of predominantly ornamental value. The second connector 420 in FIG. 4B includes a rectangular module that houses the coil head assembly. In this manner, the second connector 420 can be configured to have different shapes to power different types of devices.

The extension device 490 can be any extension device such as wall plugs, extension adapters, and/or the like. FIG. 4C illustrate examples of extension device 490 in accordance with some embodiments. Extension 490 can include male connectors such as adapter pins to connect to the first connector 410. In this manner, the first connector 410 can be configured to be compatible with different types of extension device 490. In some embodiments, the extension device 490 can be any type wall plug. The wall plug can be any type of wall plug configured to be compatible with standards of different countries.

Figure 5:
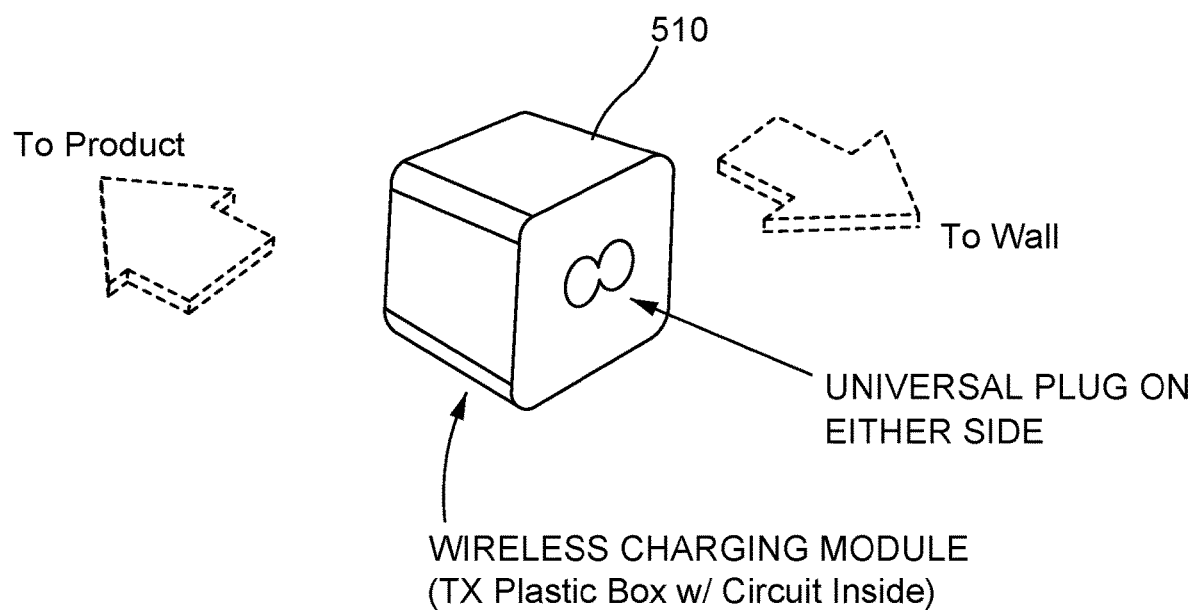
FIG. 5 illustrates a first connector of the device in FIGS. 4A-4C, according to some embodiments.

FIG. 5 is an illustration of a first connector 510 that is structurally similar to first connector 410 and/or functionally similar to first connector 110, according to some embodiments. In some embodiments, the first connector 510 can be a standard universal plug adapter with pin sockets on two sides/interfaces of the first connector 510 that are opposite to each other. A second connector can be connected to the first connector 510 via a pin socket on a first side/interface and an extension device can be connected to the first connector 510 via a pin socket on a second side/interface such that the second side/interface is opposite to the first side/interface. In some embodiments, the first connector 510 can be a standard universal plug adapter with adapter pins on two sides/interfaces of the first connector 510 that are opposite to each other. A second connector can be connected to the first connector 510 via an adapter pin on a first side/interface and an extension device can be connected to the first connector 510 via an adapter pin on a second side/interface such that the second side/interface is opposite to the first side/interface. The transmitter electronics (e.g., controller circuit, half-bridge MOSFET, and electronic filter) are disposed in the first connector 510. In some embodiments, the components of transmitter electronics, that is, the controller circuit, half-bridge MOSFET, and electronic filter are mounted on a PCB via Surface Mount Technology (SMT). The PCB can be disposed, coupled, attached, and/or integrally formed with the first connector 510. In some embodiments, the controller circuit is mounted on a PCB, and the PCB, the half-bridge MOSFET, and electronic filter are disposed in the first connector 510. Components of the first connector 510 can have similar functionality to similarly named components of FIG. 1.

Figure 6:
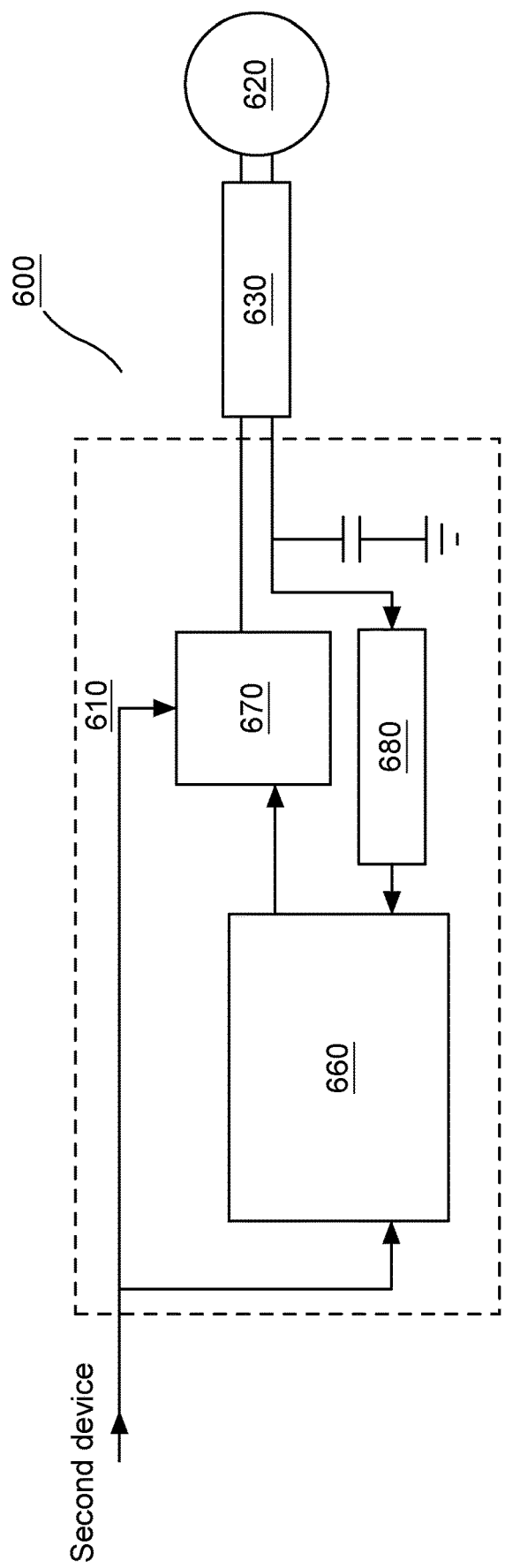
FIG. 6 is an illustration of the internal components of the first device shown in FIG. 1, according to some embodiments.

FIG. 6 is an illustration of the internal components of a device 600 that can be functionally and/or structurally similar to the first device 100 and/or the first device 200. The first connector 610 can be structurally and/or functionally similar to the first connector 110, the first connector 210, and/or the first connector 310, and include transmitter electronics such as wireless controller circuit 660, half-bridge MOSFET 670, and wave filter 680. The first connector 610 is connected via a cable 630 to a second connector 620. The second connector 620 is functionally similar to the second connector 120 in FIG. 1.

In some embodiments, the wireless controller circuit 660 is functionally similar to wireless controller circuit 760 in FIG. 5 (described later). Unless explicitly noted otherwise, components of the transmitter 600 can have similar functionality to similarly named components of FIGS. 1, 2.

In some embodiments, the first connector 610 includes transmitter electronics and the second connector 620 includes a first coil (e.g., transmitter coil). Information from a second device that acts as a receiver of the wireless charging system can be demodulated and processed at the first connector 610 and the impedance and switching frequency of the tank circuit of the first coil included in the second connector 620 can be varied based on requests from the second device. Magnetic coupling between the second connector 620 and the second device generates electric power that can be used to charge devices.

Figure 7:
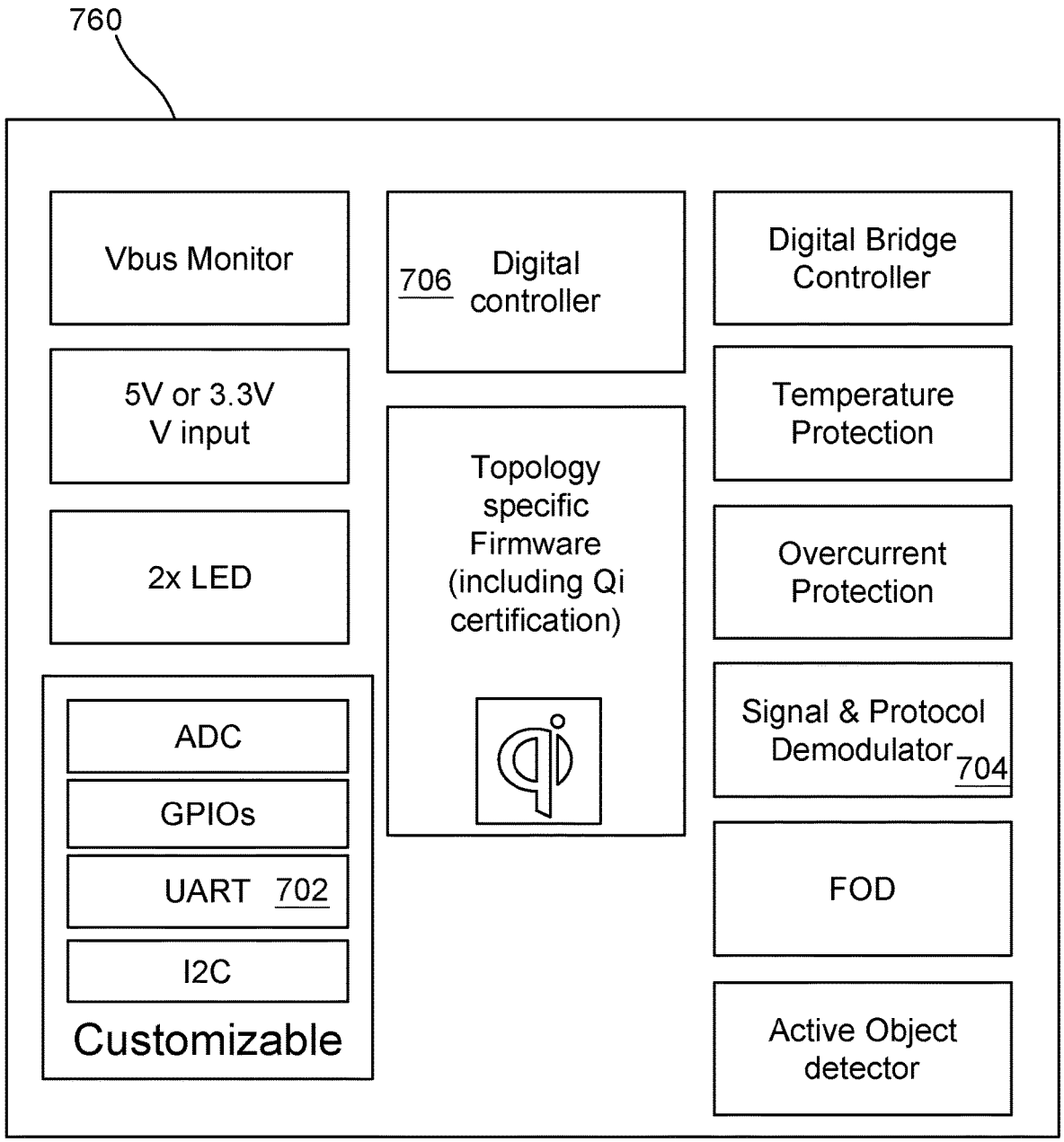
FIG. 7 illustrates a schematic of the wireless controller integrated circuit included in the first connector of the wireless charging system, according to some embodiments.

FIG. 7 illustrates a example schematic of the wireless controller integrated circuit 760 included in the first connector 110 of the device 100 of the wireless charging system, according to some example embodiments. The controller circuit 760 can be structurally and/or functionally similar to the controller circuit disclosed with respect to FIG. 1. The controller circuit 760 is configured to perform functions for transmitter control by obtaining information relating to the amount of power to be generated, demodulating and processing this information, and varying switching frequency and impedance of the transmitter coil based on the obtained information. Information is obtained as digital signals at the UART module 702. The signal and protocol demodulator 704 demodulates the information. The digital controller 706 controls the wireless charging system by determining the switching frequency and the impedance of the first coil based on the request obtained. The wireless controller circuit 760 is Qi compatible and can support up to 5W devices such as mobiles, wearable devices, sport gears, and remote controls. The controller circuit 760 can provide native support to half-bridge and full-bridge topologies.

FIG. 8 is a flowchart illustrating a method 800 for wirelessly charging a device such as a second device and/or a user device as described herein. A first connector (structurally and functionally similar to first connector 110 in FIG. 1) of a first device can obtain a packet of data. The first connector can include a controller circuit to demodulate the packet of data. In some embodiments, the packet of data can represent a request to vary power of transmission between a first transformer coil and the second transformer coil. The first transformer coil can be included in a second connector (structurally and functionally similar to second connector 120 in FIG. 1) that is communicably coupled to the first connector. The first transformer coil can include a tank circuit. The second device can include the second transformer coil.

At step 810, the first circuit can be configured to vary the switching frequency and/or the impedance of the tank circuit. In some embodiments, the first circuit can vary the switching frequency and/or impedance of the tank circuit based on the packet of data. For instance, if the packet of data represents a request to increase the output power, in response to demodulating the packet of data, the first circuit can decrease the impedance of the tank circuit and lower the switching frequency based on the impedance. However, if the packet of data represents a request to decrease the output power, in response to demodulating the packet of data, the first circuit can increase the impedance of the tank circuit and increasing the switching frequency based on the impedance.

At step 820, the first transformer coil and the second transformer coil of the second device can be magnetically coupled based on the switching frequency and/or impedance of the tank circuit. The magnetic coupling between the first transformer coil and the second transformer coil can generate output power. The generated output power can be used to power the second device.

In this manner, the form factor of the device that acts as a transmitter (for example, the device 100, the device 200, device 400, and/or the device 600) is reduced while the operating efficiency of the wireless charging system is maintained and/or improved.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: flash memory, magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially.

The invention claimed is:

1. A device, comprising:
a first connector including a Universal Serial Bus (USB) plug integrally formed with a first housing that houses a controller circuit, a field-effect transistor, and a wave filter, wherein the controller circuit is configured to send signals to the field-effect transistor and to receive filtered signals from the wave filter; and
a second connector communicably coupled to the first connector via a cable, the second connector including a second housing that houses a tank circuit including a first transformer coil,
the controller circuit configured to vary at least one of a switching frequency and impedance of the tank circuit, the first transformer coil configured to magnetically couple to a second transformer coil of a user device based on the at least one of the switching frequency and the impedance, wherein the first transformer coil is configured to power the user device based on the magnetic coupling.

2. The device of claim 1, wherein the controller circuit is further configured to receive a packet of data, the packet of data representing a request to vary power of transmission between the first transformer coil and the second transformer coil of the user device, the first circuit configured to vary at least one of the switching frequency and the impedance based on the packet of data.

3. The device of claim 2, wherein the controller circuit is further configured to digitally demodulate the packet of data and, in response to demodulating the packet of data, to vary the switching frequency based on the request.

4. The device of claim 1, wherein the second connector is configured for removably coupling to the user device.

5. The device of claim 1, wherein the controller circuit, the field-effect transistor, and the wave filter are mounted on a Printed Circuit Board (PCB) via Surface Mount Technology (SMT), the PCB being attached to and extending from the USB plug.

6. The device of claim 1, wherein the magnetic coupling between the first transformer coil and the second transformer coil powers the user device.

7. The device of claim 1, wherein the first connector includes a visual indicator to represent a charging state of the user device.

8. The device of claim 7, wherein the visual indicator includes a light pipe.

9. A wireless charging system, comprising:
a user device; and
a device, comprising:
  a first connector including a Universal Serial Bus (USB) plug integrally formed with a first housing that houses a controller circuit, a field-effect transistor, and a wave filter, wherein the controller circuit is configured to send signals to the field-effect transistor and to receive filtered signals from the wave filter; and
  a second connector communicably coupled to the first connector via a cable, the second connector including a second housing that houses a tank circuit including a first transformer coil,
  the controller circuit configured to vary at least one of a switching frequency and impedance of the tank circuit, the first transformer coil configured to magnetically couple to a second transformer coil of the user device based on the at least one of the switching frequency and the impedance, wherein the first transformer coil is configured to power the user device based on the magnetic coupling.

10. The wireless charging system of claim 9, including:
a transmitter portion configured to transform electric power from a power supply to alternating current within the first transformer coil; and
a receiver portion configured to convert alternating current within the second transformer coil to direct current to charge the user device.

11. The wireless charging system of claim 10, wherein the transmitter portion includes the device, and the receiver portion includes the user device.

12. A method, comprising:
varying, via a controller circuit, at least one of switching frequency and impedance of a tank circuit, the controller circuit integrally formed with a first connector including a Universal Serial Bus (USB) plug and being disposed in a first housing that houses a field-effect transistor, and a wave filter, wherein the controller circuit is configured to send signals to the field-effect transistor and to receive filtered signals from the wave filter, the first connector being communicably coupled to a second connector via a cable, the second connector including the tank circuit including a first transformer coil;

magnetically coupling the first transformer coil and a second transformer coil of a user device based on the at least one of the switching frequency and the impedance; and powering, the user device, based on the magnetic coupling between the first transformer coil and the second transformer coil.

13. The method of claim 12, further comprising:
obtaining, at the controller circuit, a packet of data representing a request to vary power of transmission between the first transformer coil and the second transformer coil of the user device, the varying the at least one of the switching frequency and the impedance being based on the request.

14. The method of claim 13, further comprising:
demodulating, at the controller circuit, the packet of data; and
varying, at the controller circuit, power of transmission between the first transformer coil and the second transformer coil of the user device based on the request.

15. The method of claim 14, wherein varying the at least one the switching frequency and the impedance of the tank circuit includes:
in response to demodulating the packet of data, decreasing the impedance of the tank circuit; and
lowering the switching frequency based on the impedance,
wherein the packet of data represents a request to increase the power.

16. The method of claim 14, wherein varying the at least one the switching frequency and the impedance of the tank circuit includes:
in response to demodulating the packet of data, increasing the impedance of the tank circuit; and
increasing the switching frequency based on the impedance,
wherein the packet of data represents a request to decrease the power.

17. The method of claim 12, wherein the second connector is configured for removably coupling to the user device.

18. The method of claim 12, wherein the user device includes the second transformer coil.

19. The method of claim 12, wherein the first connector includes a visual indicator, the method further comprising:
providing a first visual indication of incomplete charge of the user device via the visual indicator while charging the user device; and
providing a second visual indication of fully-charged user device via the visual indicator when the user device is fully-charged.

20. The method of claim 12, wherein the second connector has a diameter of 26 mm and a thickness of 4.5 mm.

21. The method of claim 12, wherein the first transmitter coil includes 20 strands of 0.1 mm diameter Litz wire.

* * * * *